United States Patent
Chandran

(10) Patent No.: US 11,212,741 B2
(45) Date of Patent: *Dec. 28, 2021

(54) WIRELESS CONNECTIVITY INFORMATION FOR A MOBILE DEVICE

(71) Applicant: Motorola Mobility LLC, Chicago, IL (US)

(72) Inventor: Amal Chandran, Bengaluru (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/931,947

(22) Filed: Jul. 17, 2020

(65) Prior Publication Data

US 2020/0351769 A1 Nov. 5, 2020

Related U.S. Application Data

(63) Continuation of application No. 16/213,407, filed on Dec. 7, 2018, now Pat. No. 10,785,716.

(51) Int. Cl.
*H04W 48/18* (2009.01)
*H04W 40/24* (2009.01)
(Continued)

(52) U.S. Cl.
CPC ......... *H04W 48/18* (2013.01); *H04W 40/248* (2013.01); *H04W 48/16* (2013.01); *H04W 76/11* (2018.02)

(58) Field of Classification Search
CPC ... H04W 48/18; H04W 48/16; H04W 40/248; H04W 76/11; H04W 72/04; H04W 72/12;
(Continued)

(56) References Cited

U.S. PATENT DOCUMENTS 8,843,995 B2 9/2014 Buckley et al.
9,553,981 B2 1/2017 Czarnecki et al.
(Continued)

OTHER PUBLICATIONS

Tseng, Tzu Wei, Chia Tung Wu, and Feipei Lai. "Threat analysis for wearable health devices and environment monitoring internet of things integration system." IEEE Access 7 (2019): 144983-144994. (Year: 2019).*

(Continued)

*Primary Examiner* — Sharad Rampuria
(74) *Attorney, Agent, or Firm* — FIG. 1 Patents

(57) ABSTRACT

In aspects of wireless connectivity information for a mobile device, a mobile device includes a connectivity module that determines that the mobile device is to wirelessly connect to a network. The connectivity module of the mobile device queries for a host device to provide wireless connectivity information, such as via a direct device-to-device query between the mobile device and the host device. The mobile device receives a query response from the host device, and the connectivity module obtains wireless connectivity information from the query response. The connectivity module utilizes the connectivity information to perform a focused scan for a network, such as a network identified in the query response. In response to detecting the network based on the focused scan, the connectivity module interacts with the network to establish a wireless connection between the mobile device and the network.

20 Claims, 8 Drawing Sheets

(51) Int. Cl.
*H04W 76/11* (2018.01)
*H04W 48/16* (2009.01)

(58) Field of Classification Search
CPC ... H04W 76/00; H04B 7/2121; H04B 7/2123; H04J 2203/0069; H04Q 2213/394
See application file for complete search history.

(56) References Cited

U.S. PATENT DOCUMENTS

| | | |
|---|---|---|
| 10,785,716 B2 * | 9/2020 | Chandran ............ H04W 76/10 |
| 2011/0151838 A1 | 6/2011 | Oliney et al. |
| 2017/0126705 A1 * | 5/2017 | Mirashrafi ............ H04L 63/145 |
| 2017/0295600 A1 | 10/2017 | Hassan |
| 2020/0187105 A1 | 6/2020 | Chandran |

OTHER PUBLICATIONS

"Non-Final Office Action", U.S. Appl. No. 16/213,407, dated Feb. 10, 2020, 9 pages.

"Notice of Allowance", U.S. Appl. No. 16/213,407, dated May 20, 2020, 13 pages.

* cited by examiner

WIRELESS CONNECTIVITY INFORMATION FOR A MOBILE DEVICE

RELATED APPLICATION

This application is a continuation of and claims priority under 35 U.S.C. § 120 to U.S. application Ser. No. 16/213,407, filed on 7 Dec. 2018 and titled "Wireless Connectivity Information for a Mobile Device," the disclosure of which is incorporated in its entirety by reference herein.

BACKGROUND

Wireless devices leverage wireless connectivity to networks to perform different types of tasks wirelessly, such as wireless voice and data communication. Further, a variety of different wireless connectivity protocols are available for implementing a wireless network, such as wireless cellular, wireless local area networking (WLAN), wireless broadband, and so forth. Typically, to connect to a network wirelessly, a wireless device will first perform network discovery to identify the network. The wireless device can then ascertain attributes of the network to enable the wireless device to utilize an appropriate wireless connectivity protocol for connecting to the network. This process is often performed via a network scan where a wireless device transmits some form of network connectivity request, such as a network probe, a network association request, and so on. A wireless network within range of the request can respond to the request, and the wireless device and the wireless network can interact to enable the wireless device to connect to the network.

Such traditional processes for network discovery and association, however, are resource intensive. For instance, to discover whether a wireless network is available, a wireless device will typically scan for a variety of different network types and protocols, such as 3G, 4G, 5G, WLAN, and so forth. Further, once a wireless network is discovered, a wireless device will often exchange multiple communications with the wireless network to enable a wireless connection to be established, such as to determine connectivity parameters to be used for connectivity to the wireless network. These traditional connectivity processes can be particularly taxing on devices with limited power and/or processing resources.

BRIEF DESCRIPTION OF THE DRAWINGS

Aspects of wireless connectivity information for a mobile device are described with reference to the following Figures. The same numbers may be used throughout to reference similar features and components that are shown in the Figures.

DETAILED DESCRIPTION

Figure 1:
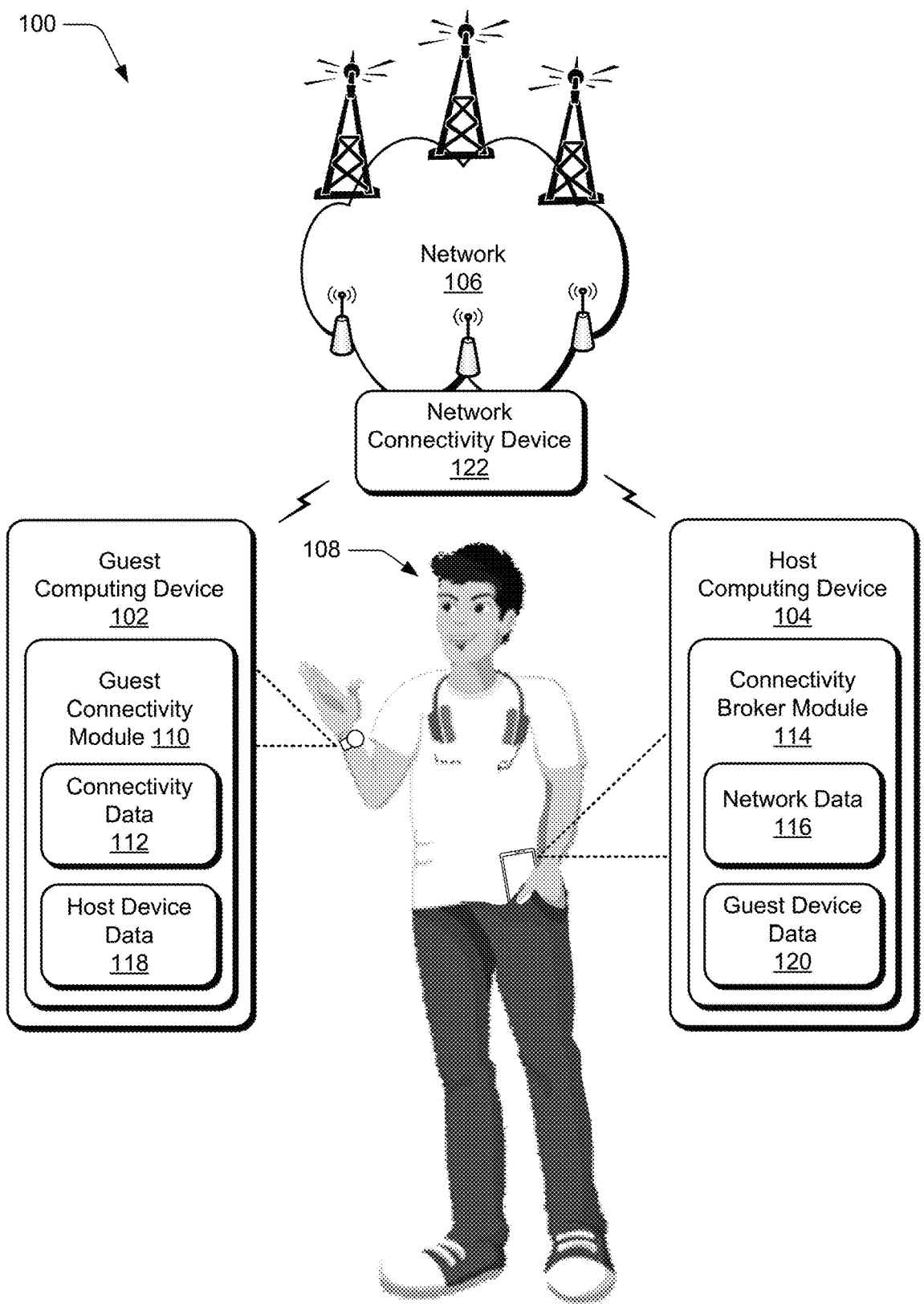
FIG. 1 illustrates an example environment in which aspects of wireless connectivity information for a mobile device can be implemented.

Techniques for wireless connectivity information for a mobile device are described, and may be implemented via interaction between a mobile device that seeks wireless connectivity to a network, and a computing device that maintains wireless connectivity information that is usable to wirelessly connect to a network. Generally, the described techniques enable the mobile device to obtain the wireless connectivity information from the computing device, and utilize the wireless connectivity information to wirelessly connect to the network.

According to various implementations, a connectivity event occurs that indicates that a mobile device is to wirelessly connect to a network. Examples of such an event include a power-on event of the mobile device (e.g., from a power off and/or hibernation state), a loss of connectivity to a previous network, the mobile device moving from one geographic location to a different geographic location, an indication to send and/or receive data when the mobile device is not currently connected to a wireless network, and so forth.

Based on the connectivity event, the mobile device initiates a process to obtain wireless connectivity information that is usable to wirelessly connect to a network such that the mobile device can utilize the wireless connectivity for various purposes, such as to communicate data wirelessly via the network. The mobile device, for instance, searches a local data storage of the mobile device to determine whether usable and valid wireless connectivity information is available locally. If the mobile device locates wireless connectivity information for a network on the local data storage, the mobile device attempts to wirelessly connect to the network using the local wireless connectivity information. If this attempt is successful (i.e., the local wireless connectivity information is valid for establishing wireless connectivity to a network), the mobile device utilizes the wireless connection to the network to communicate various types of data via the network.

However, if the attempt to connect to the network using the local wireless connectivity information is not successful (e.g., the network is unavailable and/or the information is not valid), the mobile device communicates a query for a host computing device ("host device") to provide the mobile device with wireless connectivity information. In at least one implementation, the query represents a direct device-to-device communication (e.g., a wireless and/or wired communication) directed to a host device. Accordingly, a host device within wireless range of the query receives the query and ascertains that the query is requesting wireless connectivity information for connecting wirelessly to an available network. In addition to requesting wireless connectivity information, the query may include various connectivity criteria for wireless connectivity, such as a wireless protocol supported by the mobile device.

Responsive to the query, the host device identifies wireless connectivity information that is usable to wirelessly connect the mobile device to a network (e.g., that corresponds to specified connectivity criteria), and generates a query response that includes the wireless connectivity information. The host device then wirelessly transmits the query response for receipt by the mobile device. The mobile device receives the query response, extracts the wireless connectivity information, and attempts to utilize the wireless connectivity information to establish a wireless connection to a network. In an example implementation, the query response includes a network identifier (ID) and a wireless frequency for a particular network, and thus the mobile device performs a focused network scan for the network using the network ID and the wireless frequency. The focused scan, for instance, does not involve a general scan across multiple frequencies, but utilizes a focused frequency or set of frequencies provided in the query response from the host device. Thus, if the focused scan is successful in detecting an available network, the mobile device negotiates a wireless connection with the network, and utilizes the wireless connection to communicate various types of data wirelessly.

According to various implementations, if a host device is not available to provide wireless connectivity information, or if wireless connectivity information received from a host device cannot be effectively used to establish wireless network connectivity for the mobile device, the mobile device can fall back to a typical network scan process. The mobile device, for instance, can perform a general wireless scan across multiple different wireless frequencies for different connectivity protocols (e.g., 3G, 4G, 5G, WiFi™, and so forth) until a network is detected and a wireless connection to the network is successfully established. As further described below with reference to FIG. 6, if information received from a host device is not successfully used to establish wireless connectivity to a network, certain portions of the information may be used to arrange the general wireless scan.

Accordingly, by obtaining wireless connectivity information from a host device and utilizing the information as part of a focused scan for a network, a mobile device conserves device resources that would be used for a general network scan, such as power resources (e.g., battery charge), processor resources (e.g., processor bandwidth), wireless radio resources, and so forth. For instance, a general wireless scan across multiple frequency bands for a wireless network uses significantly more power than a focused wireless scan for a particular instance of a network. For mobile devices with limited resources, such as wearable computing devices and other small form factor devices, the ability to conserve resources using wireless connectivity information received from a host device can improve device performance, such as by conserving battery charge.

While features and concepts of wireless connectivity information for a mobile device can be implemented in any number of different devices, systems, environments, and/or configurations, aspects of wireless connectivity information for a mobile device are described in the context of the following example devices, systems, and methods.

FIG. 1 illustrates an example environment 100 in which aspects of wireless connectivity information for a mobile device can be implemented. The example environment 100 includes a guest computing device ("guest device") 102, a host computing device ("host device") 104, and a network 106. In this particular example, the guest device 102 and the host device 104 represent different devices carried by a user 108. The guest device 102, for instance, represents a wearable computing device, such as a smartwatch or a fitness tracker. Further, the host device 104 represents a portable device such as a smartphone, a tablet device, a laptop, and so forth. These examples are not to be construed as limiting, however, and the guest device 102 and the host device 104 can be implemented in a variety of different ways and form factors. In at least one implementation, the host device 104 represents a device with greater operational resources than the guest device 102, such as higher power capacity (e.g., greater battery charge capacity), higher processing bandwidth, higher data storage capacity, and so forth.

According to implementations for wireless connectivity information for a mobile device, the guest device 102 can interact with the host device 104 to enable the guest device 102 to connect to the network 106. The guest device 102, for instance, includes a guest connectivity module 110, which is representative of functionality to obtain connectivity data 112 from the host device 104. Generally, the connectivity data 112 represents data that is usable by the guest device 102 to wirelessly connect to the network 106. Examples of the connectivity data 112 include a network identifier ("ID") for the network 106, wireless frequencies used by the network 106, network power level, scrambling code(s) used by the network 106, a Public Land Mobile Network (PLMN) to which the network 106 is connected, and so forth. Generally, the network 106 can support wireless connectivity using any suitable technology or protocol, such as wireless cellular (e.g., 3G, 4G, 5G), wireless broadband, Wireless Local Area Network (WLAN) (e.g., WiFi), wireless short distance communication (e.g., Bluetooth™, Near Field Communication (NFC)), and so forth. Further, the network 106 can enable various types of network connectivity, such as access to a personal area network, a corporate network, and/or access to the Internet.

In one or more implementations, the guest device 102 obtains the connectivity data 112 via interaction between the guest connectivity module 110 and a connectivity broker module 114 of the host device 104. The connectivity broker module 114, for instance, represents functionality to ascertain attributes of different networks (e.g., the network 106), and to store and/or access this data as network data 116. The network data 116, for example, represents a source of at least some of the connectivity data 112, as well as other network information pertaining to the network 106 and/or other wireless networks. Thus, the host device 104 can share the network data 116 with the guest device 102 (as well as other devices) as the connectivity data 112 to enable the guest device 102 to utilize the connectivity data 112 to connect to the network 106.

The guest connectivity module 110 further maintains and/or has access to host device data 118, which is representative of data that describes attributes of different host devices, including the host device 104. The host device data 118, for instance, includes identifiers for different host devices, such as Internet Protocol (IP) addresses, Medium Access Control (MAC) addresses, International Mobile Equipment Identity (IMEI) numbers, and so forth. The host device data 118 may also include location data that indicates known locations for different host devices, such as geographic locations (e.g., based on geographical information, such as Global Positioning System (GPS) coordinates) and/or logical locations, e.g., based on network addresses. In at least one implementation, the host device data 118 can map device identifiers for specific host devices to known locations where the host devices are likely present, such as to enable the guest device 102 to predict whether a particular host device will be present at a particular location.

Further to the environment 100, the connectivity broker module 114 of the host device 104 maintains and/or has access to guest device data 120, which represents data that describes attributes of different guest devices, such as the guest device 102. The guest device data 120, for instance, includes device identifiers for different guest devices. Examples of different suitable types of identifiers are discussed above with reference to the host device data 118. The guest device data 120 may also indicate whether particular instances of guest devices are permitted to receive network data 116 to enable the guest devices to connect to the network 106. For instance, some guest devices may be identified as authenticated to receive the network data 116, whereas other guest devices are not identified as being authenticated to receive the network data 116, and/or are indicated as not being permitted to receive the network data 116. This type of data can be useful in preventing unknown guest devices and/or known suspicious guest devices from gaining access to the network 106, such as to prevent potentially malicious behavior from occurring on the network 106.

To enable various devices to connect wirelessly to the network 106, the network 106 leverages a network connectivity device 122. Generally, the network connectivity device 122 is representative of functionality to receive and transmit wireless signal and serve as an access portal for the network 106. Examples of the network connectivity device 122 include a wireless cellular base station, a wireless access point (e.g., for a WLAN and/or a Wireless Wide Area Network (WWAN)), a short-range wireless network access point, and so forth.

Example implementations of wireless connectivity information for a mobile device that utilize different aspects of the environment 100 are now described.

Figure 2:
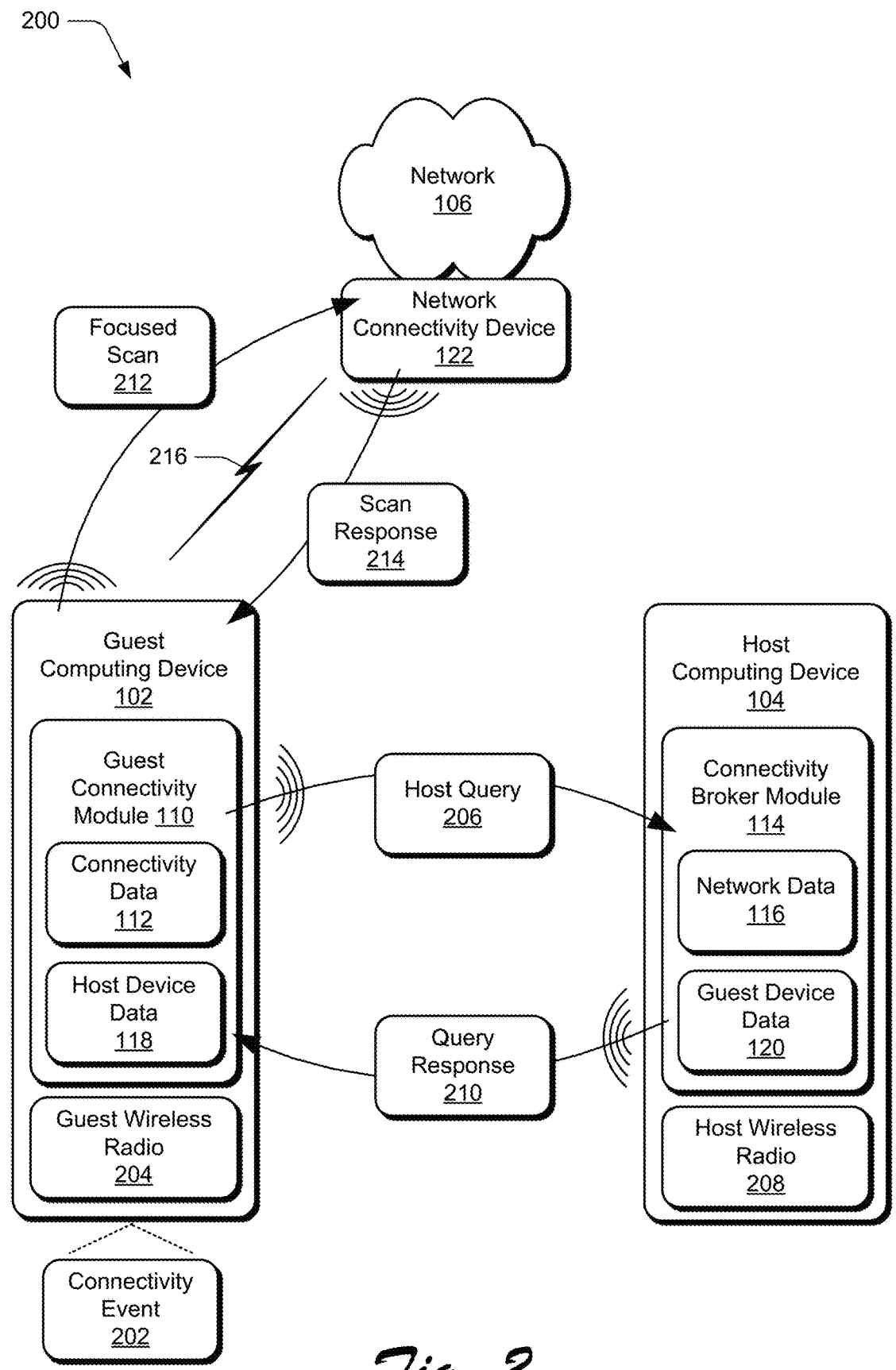
FIG. 2 illustrates an example system for wireless connectivity information for a mobile device in accordance with one or more implementations described herein.

FIG. 2 illustrates an example system 200 in which aspects of wireless connectivity information for a mobile device can be implemented. The example system 200 includes the guest device 102, the host device 104, and the network 106 as introduced with reference to FIG. 1. In the system 200, the guest device 102 seeks to establish a connection to a wireless network. For instance, a connectivity event 202 occurs in relation to the guest device 102 that causes the guest device 102 to initiate a process to connect to a wireless network. Examples of the connectivity event 202 include a power-on event (e.g., from a powered-off or hibernation state), a relocation from one geographic location to another, a user-initiated process requesting that the guest device 102 connect to a wireless network, and so forth.

Accordingly, the guest device 102 utilizes a guest wireless radio system ("guest wireless radio") 204 to wirelessly transmit a host query 206 for receipt by the host device 104. Generally, the host query 206 requests that the host device 104 provide information for an available wireless network at the location of the guest device 102. In at least one implementation, the guest connectivity module 110 is configured to generate the host query 206 for transmission directly to the host device 104, e.g., according to a known communication protocol for communicating with the host device 104. For instance, the host device data 118 can specify a protocol for communicating with the host device 104, such as a device identifier to use for querying the host device, a wireless frequency or frequency range to use for transmitting the host query 206, and so forth. Thus, the guest device 102 can transmit the host query 206 according to the specified protocol. In at least one implementation, the guest device 102 does not transmit the host query 206 by scanning through multiple different wireless frequencies, but transmits the host query 206 using a pre-specified wireless frequency or set of wireless frequencies that are known to be used by the host device 104. Alternatively or in addition, the guest device 102 can transmit the host query 206 across multiple different wireless frequencies for receipt by the host device 104.

Generally, the guest connectivity module 110 can include various types of information in the host query 206, such as a device ID for the guest device 102, a device type for the guest device 102, wireless protocols supported by the guest device 102, power level (e.g., available battery charge) for the guest device 102, and so forth.

Continuing, a host wireless radio system ("host wireless radio") 208 of the host device 104 receives the host query 206, and the connectivity broker module 114 inspects the host query 206 to ascertain that the guest device 102 is requesting information that is usable to connect the guest device 102 to a wireless network. For instance, the connectivity broker module 114 inspects the host query 206 to identify various data within the host query 206, such as a device ID for the guest device 102 and wireless protocols supported by the guest device 102. In at least one implementation, the connectivity broker module 114 can ascertain whether the guest device 102 is permitted to receive network connectivity information, such as by determining whether the guest device 102 is identified in the guest device data 120 as being permitted to receive network connectivity information.

Responsive to the host query 206 (and optionally, verifying that the guest device 102 is permitted to receive connectivity information), the connectivity broker module 114 generates a query response 210 and the host wireless radio 208 wirelessly transmits the query response 210 for receipt by the guest device 102. The query response 210, for instance, includes wireless connectivity data that is usable by the guest device 102 to wirelessly connect to the network 106. The guest wireless radio 204 receives the query response 210, and the guest connectivity module 110 retrieves wireless connectivity data from the query response 210 and stores the data as part of the connectivity data 112. Examples of different types of data that can be included in the connectivity data 112 are described above.

Accordingly, the guest connectivity module 110 utilizes the connectivity data 112 to perform a focused scan 212 for the network 106. For instance, the focused scan 212 is based on a network ID and/or a set of wireless frequencies provided in the query response 210 from the host device 104. The guest device 102, for example, does not perform the focused scan 212 by scanning different sets of wireless frequencies in search of an available network, but instead only scans for wireless frequencies identified in the query response 210. Thus, the guest device 102 detects the network 106 based on the focused scan 212, and leverages the guest wireless radio 204 to initiate wireless communication with the network connectivity device 122 for wireless connectivity to the network 106.

Proceeding, the network connectivity device 122 detects the focused scan 212 and wirelessly transmits a scan response 214 for receipt by the guest device 102. The scan response 214, for instance, includes parameters to be used by the guest device 102 for connecting to the network 106. Examples of such parameters include a set of wireless frequencies to be used by the guest device 102 for transmitting and receiving wireless signal with the network 106, scrambling code(s) used by the network 106, a codec used by the network 106, and so forth. According to various implementations, at least some of the information included in the scan response 214 can be the same as or different than the information included in the query response 210 from the host device 104. For instance, the network connectivity device 122 can assign a different wireless frequency set to be used by the guest device 102, for connecting to the network 106 than was originally identified in the query response 210.

Accordingly, the guest wireless radio 204 receives the scan response 214 and the guest connectivity module 110 utilizes information from the scan response 214 to update the connectivity data 112. The guest connectivity module 110 then utilizes the connectivity data 112 to establish a wireless connection 216 with the network connectivity device 122 to enable the guest device 102 to transmit and receive wireless signal via the network 106. Generally, this enables the guest device 102 to transmit and receive various types of information wirelessly via the wireless connection 216, such as for wireless voice and/or data communication via the network.

Figure 3:
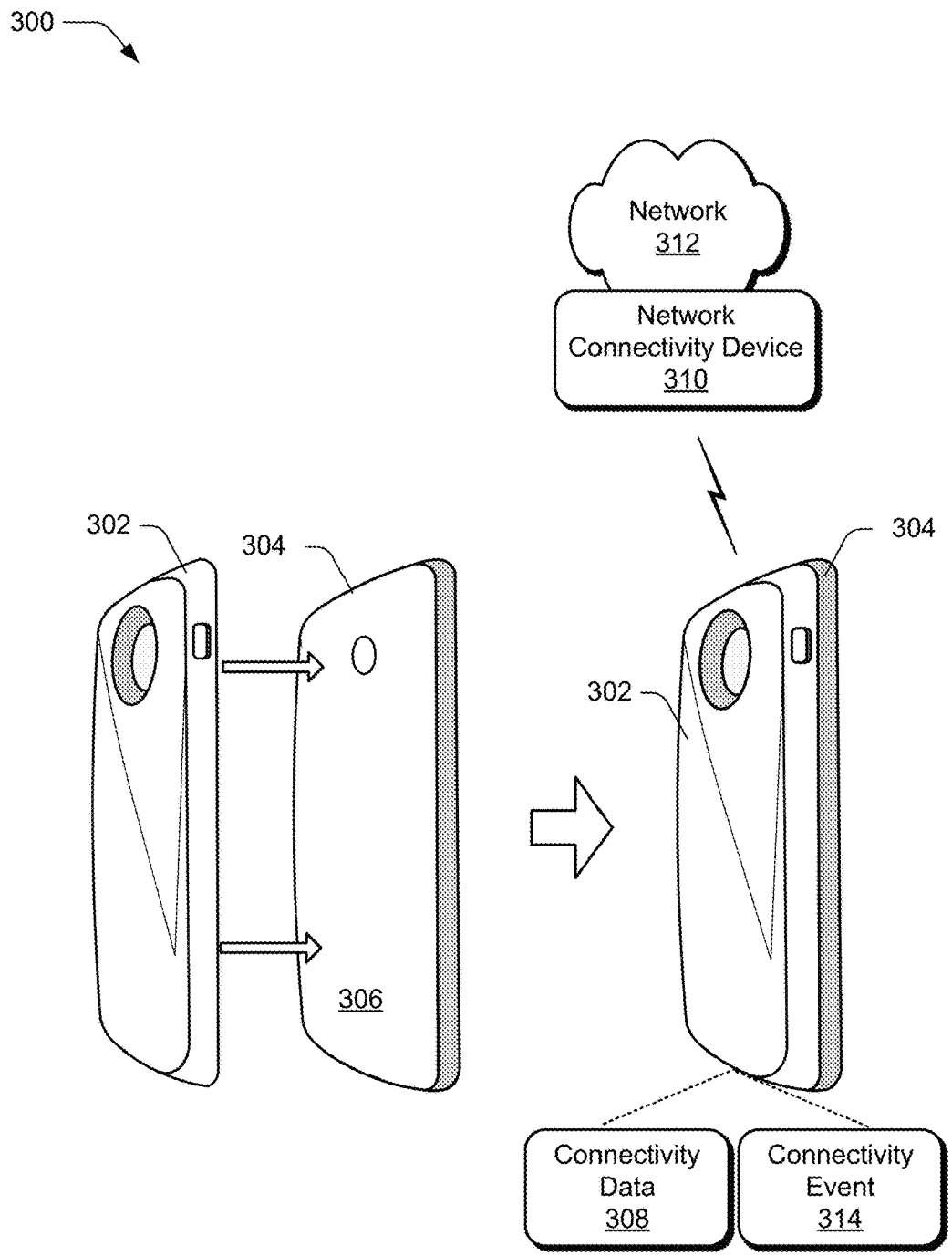
FIG. 3 illustrates an example system for wireless connectivity information for a mobile device in accordance with one or more implementations described herein.

FIG. 3 illustrates an example system 300 in which aspects of wireless connectivity information for a mobile device can be implemented. The example system 300 includes a guest device 302 and a host device 304, which represent implementations of the guest device 102 and the host device 104, respectively, introduced above. In this particular example, the host device 304 represents a mobile device such as a smartphone, and the guest device 302 represents a peripheral device that is physically attachable to the host device 304. The guest device 302, for instance, can provide added functionality to the host device 304, such as expanded camera functionality, audio output, digital assistant integration, and so forth. In at least one implementation, the guest device 302 can be attached to a rear surface 306 of the host device 304, as shown in the right hand portion of the system 300. Generally, the guest device 302 can be attached to the host device 304 using any suitable attachment mechanism, such as via magnetic attachment, using mechanical attachment (e.g., a clip), and so forth.

Further to the system 300, the guest device 302 can interact with the host device 304 to enable the host device 304 to provide connectivity data 308 to the guest device 302. Generally, the connectivity data 308 enables the guest device 302 to connect wirelessly to a network connectivity device 310 for wireless connectivity to a network 312. For instance, the guest device 302 and the host device 304 may utilize any of the various techniques described herein for causing the guest device 302 to obtain the connectivity data 308 from the host device 304, such as described with reference to the system 200. According to various implementations, a connectivity event 314 can cause the guest device 302 and/or the host device 304 to initiate a process for propagating the connectivity data 308 to the guest device 302. Examples of the connectivity event 314 include a connectivity event initiated when the guest device 302 is attached to the host device 304, and/or a power-on event when the guest device 302 is powered on. Other examples of such an event are described elsewhere herein, and are applicable to the system 300.

The systems 200, 300 present a few example implementations for wireless connectivity information for a mobile device, and other variations are contemplated to be within the scope of the claimed implementations, examples of which are discussed below.

Generally, any of the computing and mobile devices described herein can communicate via any type of communication directly and/or via a data network (or combination of networks), such as for data communication between the guest devices 102, 302 and the host devices 104, 304. Further, the networks 106, 312 can be implemented to include a wired and/or wireless network, may be implemented using any type of network topology and/or communication protocol, and can be represented or otherwise implemented as a combination of two or more networks, to include cellular networks, IP-based networks, and/or the Internet. The networks 106, 312 may also include mobile operator networks that are managed by a network provider of a cellular network, a mobile network operator, and/or other network operators, such as a communication service provider, mobile phone provider, and/or Internet service provider.

Example methods 400-700 are described with reference to respective FIGS. 1-3 in accordance with implementations of wireless connectivity information for a mobile device. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 4:
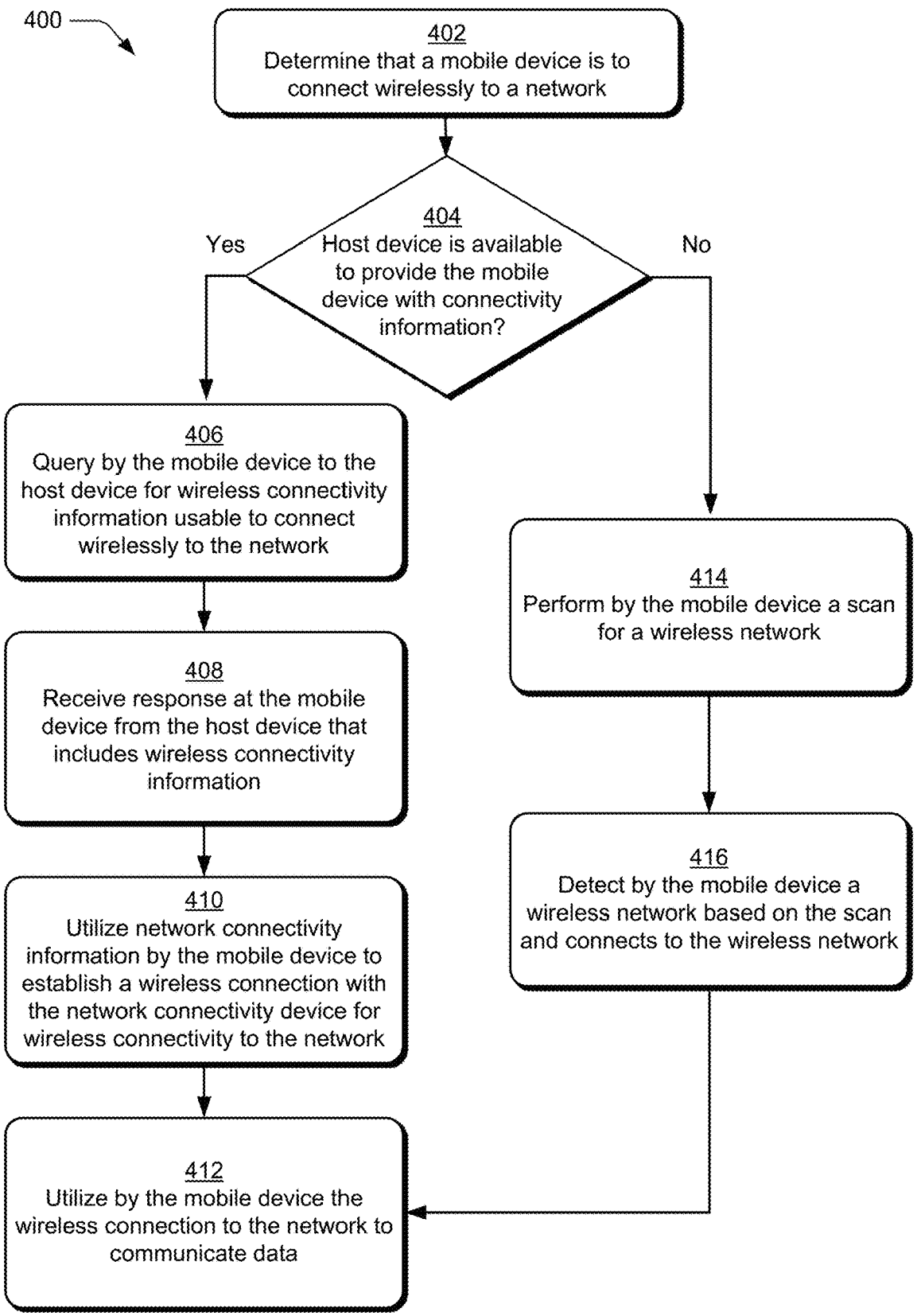
FIG. 4 illustrates an example method of wireless connectivity information for a mobile device in accordance with one or more implementations described herein.

FIG. 4 illustrates example method(s) 400 of wireless connectivity information for a mobile device as described herein, and the method is generally described with reference to a mobile device implemented to obtain wireless connectivity data for connecting wirelessly to a network.

At 402, a determination is made that a mobile device is to connect wirelessly to a network. For instance, an event occurs in relation to the guest device 102 to cause the guest device 102 to initiate a process for obtaining a wireless connection to a network. Examples of such an event include a power-on event, a move to a different location, user input requesting a wireless network connection, a physical connection of the guest device 102 to the host device 104, a failure of a previous wireless network connection, a request to perform a handover from a current wireless network connection, and so forth.

At 404, a determination is made whether a host device is available to provide the mobile device with connectivity information for connecting wirelessly to a network. The guest device 102, for instance, transmits a wireless query (e.g., the host query 206) for receipt by the host device 104 requesting whether the host device 104 is available to provide connectivity information. In at least one implementation, the host query 206 is transmitted as a direct device-to-device transmission (e.g., wireless and/or wired communication) between the guest device 102 and the host device 104. For instance, in such implementations, the guest device 102 addresses the host query 206 directly to the host device 104 and wirelessly transmits the host query 206 for direct receipt by the host device 104, e.g., without utilizing or connecting to a network or other intermediate entity. Different types of direct device-to-device wireless connectivity may be employed for communicating the host query 206, such as Bluetooth™, WiFi Direct™, NFC, Zigbee, and so forth.

If a host device is available ("Yes"), at 406 a query is made by the mobile device to the host device for wireless connectivity information usable to connect wirelessly to the network. For example, the guest device 102 receives a notification that the host device 104 is available, such as the query response 210 transmitted wirelessly from the host device 104. In an example implementation, to query for wireless connectivity information, the guest device 102 transmits the host query 206 via a wireless signal addressed to the host device 104. In at least one implementation, steps 404 and 406 are performed as part of a single wireless communication, e.g., the host query 206. Alternatively, steps 404 and 406 can be performed via separate wireless communications. Generally, a query for a host device and a query for connectivity information, whether performed together or separately, represent dedicated communications that are separate and distinct from a scan to detect a wireless network.

At 408, a response is received at the mobile device from the host device that includes wireless connectivity information. The guest device 102, for instance, receives the query response 210, which may include various types and instances of connectivity information that usable to wirelessly connect with the network 106. For example, the wireless connectivity information includes a set of one or more wireless frequencies that are usable to communicate with the network connectivity device 122 to enable the guest device 102 to establish a wireless connection with the network 106.

In at least one implementation, the query response 210 includes information for multiple different networks that are available for wireless connectivity. Thus, the guest connectivity module 110 can select a suitable network based on various criteria. For instance, the guest connectivity module 110 can select an appropriate network based on a connectivity protocol supported by the guest device 102, and/or a preferred connectivity protocol for the guest device 102. The query response 210, for example, may identify multiple different networks that are each implemented by a different connectivity protocol, such as 3G, 4G, 5G, WiFi™, and so forth. Thus, the guest connectivity module 110 can select a particular network based on which protocol the guest device 102 is capable of supporting, and/or which is a preferred connectivity protocol, and utilize the wireless connectivity information for the selected network.

At 410, the wireless connectivity information is utilized by the mobile device to establish a wireless connection with a network connectivity device for wireless connectivity to the network. For example, the guest connectivity module 110 utilizes the connectivity information (e.g., the set of wireless frequencies) from the query response 210 to wirelessly communicate with the network connectivity device 122 and negotiate the wireless connection 216 with the network 106.

As mentioned above, the query response 210 may include wireless connectivity information for multiple different networks. Thus, in at least one implementation, the guest connectivity module 110 can perform an iterative scan process through the multiple networks until a wireless connection is successfully established between the guest device 102 and a particular network. For instance, based on capabilities and/or preferences of the guest device 102, the guest connectivity module 110 can select a most preferable network from the query response 210 and attempt to connect to that network. If that connection attempt fails, the guest connectivity module 110 can then select a next preferable network and attempt to wirelessly connect. This process can continue until a wireless connection to a network is successfully established.

At 412, the mobile device utilizes the wireless connection to the network to communicate data. The guest device 102, for instance, utilizes the wireless connection 216 to the network 106 to transmit and receive data, such as voice, video, and other types of data.

Returning to 404, if a host device is not available ("No"), at 414 the mobile device performs a scan for a wireless network. The guest device 102, for instance, does not detect that the host device 104 is present and/or available to provide wireless connectivity information. Accordingly, the guest device 102 performs a general scan to attempt to detect an available wireless network. The guest connectivity module 110, for instance, leverages the guest wireless radio 204 to scan for transmission from a wireless network. In at least one implementation, this involves generally scanning through multiple different frequency ranges to detect whether a network is transmitting wireless signal, such as frequency ranges for 3G, 4G, 5G, WiFi™, and so forth. Generally, this type of scan is different than the focused scan 212 since the focused scan 212 is based on the guest device 102 receiving wireless connectivity data for a specific network, whereas this general scan is typically performed without knowledge of a specific network.

At 416, the mobile device detects a wireless network based on the scan and connects to the wireless network. For instance, the guest device 102 detects wireless transmission from the network 106, and negotiates with the network 106 for a wireless connection to the network 106. The method then proceeds to 412.

In at least some implementations, the connectivity process utilizing 414, 416 uses more computing resources (e.g., battery power and/or processor resources) of the mobile device than the process of connecting to the network wirelessly via connectivity information received from the host device 104. For instance, utilizing the focused scan 212 uses less power and/or processing resources than a general scan for an available network.

As an extension and/or variation on the method 400, during a period when the guest device 102 is not utilizing a network connection, the guest device 102 can power off its radio functionality (e.g., the guest wireless radio 204) to conserve power. Accordingly, when a further event occurs indicating that the guest device 102 is to wirelessly connect to a network, the method 400 can be performed again, e.g., starting at 402.

As yet another an extension and/or variation on the method 400, during a period when the guest device 102 has low power resources (e.g., available battery charge is below a threshold level), the guest device 102 can rely on wireless connectivity data from the host device 104 and not perform network scanning. For instance, the guest connectivity module 110 can enter a "host only" mode where the guest device 102 queries the host device 104 for network data and does not perform network scanning itself. In at least one implementation, if the host device 104 does not have wireless connectivity data available for a network, the guest device 102 instructs the host device 104 to perform a network scan and return any wireless connectivity data for a network that the host device 104 discovers as part of its network scan.

Generally, this enables the guest device 102 to obtain wireless connectivity data even when power resources of the guest device 102 are low.

Figure 5:
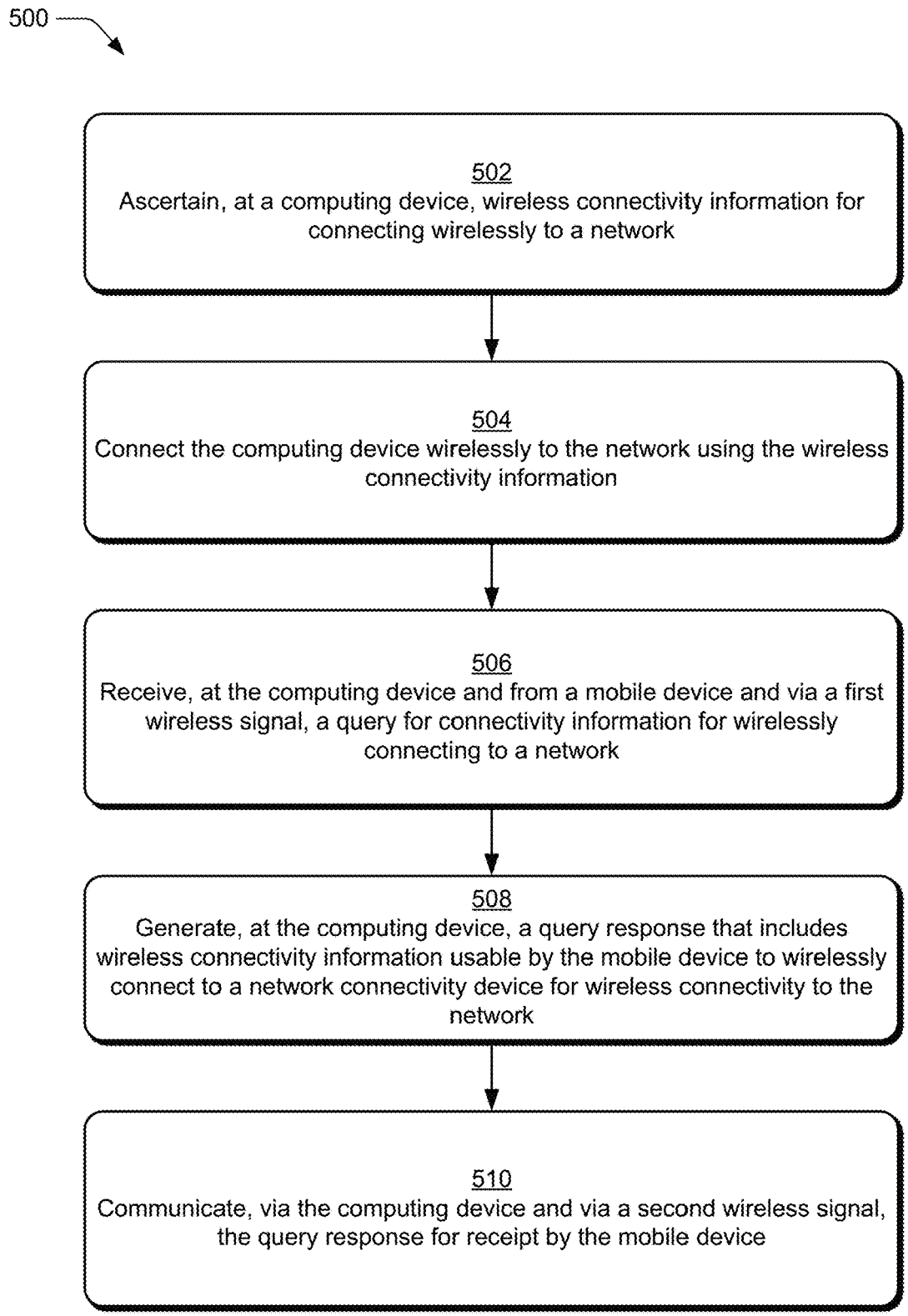
FIG. 5 illustrates an example method of wireless connectivity information for a mobile device in accordance with one or more implementations described herein.

FIG. 5 illustrates example method(s) 500 of wireless connectivity information for a mobile device as described herein, and the method is generally described with reference to a computing device implemented to enable a mobile device to obtain wireless connectivity to a network.

At 502, a computing device ascertains wireless connectivity information for connecting wirelessly to a network. The host device 104, for instance, performs a wireless network scan and detects the network 106. In at least one implementation, this involves scanning through multiple different frequency ranges to detect whether a network is transmitting wireless signal, such as frequency ranges for 3G, 4G, 5G, WiFi™, and so forth.

At 504, the computing device wirelessly connects to the network using the wireless connectivity information. For example, the host device 104 connects wirelessly to the network connectivity device 122 via an association process, and exchanges various types of data wirelessly via the network 106. The connectivity broker module 114 may then store the wireless connectivity information as part of the network data 116. In at least one implementation, the network data 116 may include information for multiple different networks, such as multiple networks that are available at a particular location for wireless connectivity. Further, the networks may be sorted and/or identified based on their respective characteristics, such as connectivity protocols utilized by the networks, network quality (e.g., historic signal quality), network carrier identity (e.g., a service provider that implements the network), and so forth.

At 506, the computing device receives, from a mobile device and via a first wireless signal, a query for connectivity information for wirelessly connecting to a network. The host device 104, for instance, receives the host query 206 from the guest device 102. Different example attributes of the host query 206 are described above. In at least one implementation, the host query 206 is received as a direct device-to-device wireless communication between the guest device 102 and the host device 104. For example, the host device 104 receives the host query 206 directly from the guest device 102 and not via an intermediate connection, such as a network connection.

At 508, the computing device generates a query response that includes wireless connectivity information usable by the mobile device to wirelessly connect to a network connectivity device for wireless connectivity to the network. The connectivity broker module 114, for instance, generates the query response 210 to include various types of information that is usable by the guest device 102 to wirelessly connect to the network 106. Examples of such information are described in detail above, and include a set of one or more wireless frequencies that are usable to wirelessly communicate with the network connectivity device 122. Generally, and as described above, the network connectivity device 122 represents a separate and distinct entity from the host device 104.

In at least one implementation, the connectivity broker module 114 selects the wireless connectivity information for a network that corresponds to a connectivity criteria (e.g., a connectivity requirement and/or preference) of the guest device 102. For instance, the host query 206 may identify a connectivity criteria for the guest device 102, such as a wireless connectivity protocol(s) supported and/or preferred by the guest device 102. Thus, the connectivity broker module 114 selects a network that corresponds to the connectivity criteria, such as a network that supports a particular wireless connectivity protocol.

At 510, the computing device communicates, via a second wireless signal, the query response for receipt by the mobile device. For example, the connectivity broker module 114 leverages the host wireless radio 208 to communicate the query response 210 as a wireless signal addressed to the guest device 102. The query response 210, for instance, represents a direct device-to-device communication between the host device 104 and the guest device 102. The guest device 102 receives the query response 210, and can utilize the connectivity information from the query response 210 to attempt to connect wirelessly to the network 106.

Figure 6:
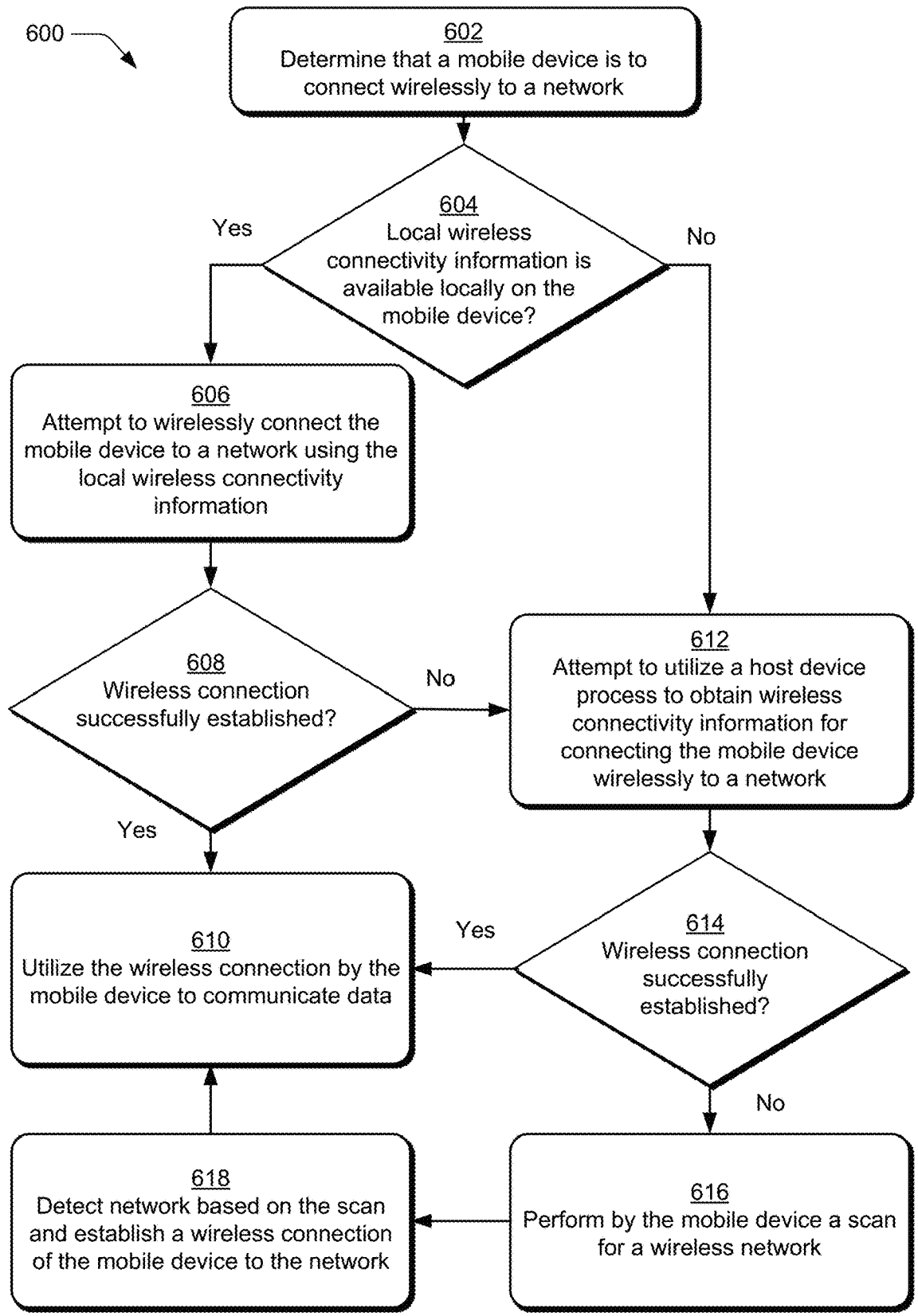
FIG. 6 illustrates an example method of wireless connectivity information for a mobile device in accordance with one or more implementations described herein.

FIG. 6 illustrates example method(s) 600 of wireless connectivity information for a mobile device as described herein, and the method is generally described with reference to a mobile device attempting to obtain wireless connectivity to a network. In at least one implementation, the method represents an extension and/or variation on the method 400, described above.

At 602, a determination is made that a mobile device is to wirelessly connect to a network. For instance, the connectivity event 202 occurs in relation to the guest device 102 to cause the guest device 102 to initiate a process for obtaining a wireless connection to a network. Examples of such an event include a power-on event, a move to a different location, user input requesting a wireless network connection, a failure of a previous wireless network connection and so forth.

At 604, a determination is made whether local wireless connectivity information is available locally on the mobile device. The guest connectivity module 110, for example, searches the connectivity data 112 to determine whether wireless connectivity information is available. In at least one implementation, the guest connectivity module 110 can search the connectivity data 112 using context information pertaining to a current context of the guest device 102, such as a geographical location, a wireless protocol utilized by the guest device 102, available power resources (e.g., battery charge level), and so forth. Thus, the guest connectivity module 110 can attempt to locate wireless connectivity information for a network that corresponds to the context information.

If local wireless connectivity information is available locally on the mobile device ("Yes"), at 606 an attempt is made to wirelessly connect the mobile device to a network using the local wireless connectivity information. Examples of different types of wireless connectivity information are detailed throughout, and include a set of one or more wireless frequencies that correspond to a particular network.

In at least one implementation, the connectivity data 112 can include wireless connectivity information for multiple different networks. Thus, the guest connectivity module 110 can scan sequentially through the wireless connectivity information for the different networks, such as in order of preferred network and starting with a most preferred network.

At 608, a determination is made whether a wireless connection to a network is successfully established based on the local wireless connectivity information. If a wireless connection to a network is successfully established ("Yes"), at 610 the wireless connection is utilized by the mobile device to communicate data. The guest device 102, for instance, connects wirelessly to the network 106 (e.g., via the network connectivity device 122), and utilizes the wireless connection to transmit and receive data.

If a wireless connection to a network is not successfully established based on the local wireless connectivity information ("No"), at 612 an attempt is made to utilize a host device process to obtain wireless connectivity information for connecting wirelessly to a network. Examples of different processes that utilize a host device for wireless connectivity information are detailed throughout, such as with reference to the method 400 of FIG. 4. At 614, a determination is made whether a wireless connection to a network is successfully established using the host device process. If a wireless connection of the mobile device to a network is successfully established using the host device process ("Yes"), the method proceeds to 610.

If a wireless connection to a network is not successfully established using the host device process ("No"), at 616 a scan for a wireless network is performed by the mobile device. The guest device 102, for instance, performs a general scan to attempt to detect an available wireless network, and the scan does not utilize any wireless connectivity information received from the host device 104. For example, the guest connectivity module 110 leverages the guest wireless radio 204 to scan for transmission from a wireless network. In at least one implementation, this involves scanning through multiple different frequency ranges to detect whether a network is transmitting wireless signal, such as frequency ranges for 3G, 4G, 5G, WiFi™, and so forth.

As an additional or alternative implementation, the scan performed at 616 can utilize information received from the host device 104 (e.g., as part of the query response 210) to inform the general scan for a wireless network. For instance, consider that in addition to a set of wireless frequencies, the query response 210 includes other relevant information, such as a geographical location in proximity to the guest device 102. When the scan performed using the set of wireless frequencies (e.g., at 612) is not successful, the other relevant information can be utilized to determine how to perform a general scan. For example, where the query response 210 includes a geographic location, the general scan by the guest device 102 can start with scanning wireless frequencies known to be associated with a wireless network at the geographic location. Thus, in at least one implementation, a general scan across multiple frequency ranges can still be initiated, but the general scan can be ordered, arranged, and/or prioritized based on pertinent information received from the host device 104, e.g., information other than wireless frequencies.

At 618, a network is detected based on the scan and a wireless connection of the mobile device to the network is established. For instance, the guest device 102 detects wireless transmission from the network 106, and negotiates with the network 106 for a wireless connection to the network 106. The method then proceeds to 610.

Returning to 604, if local wireless connectivity information is not available locally on the mobile device ("No"), the method proceeds to 612 and then proceeds as described above.

According to various implementations, aspects of the methods 400, 600 may be interchanged to enable different wireless connectivity scenarios, such as to enable a mobile device to utilize a variety of different options for obtaining wireless connectivity to a network.

Figure 7:
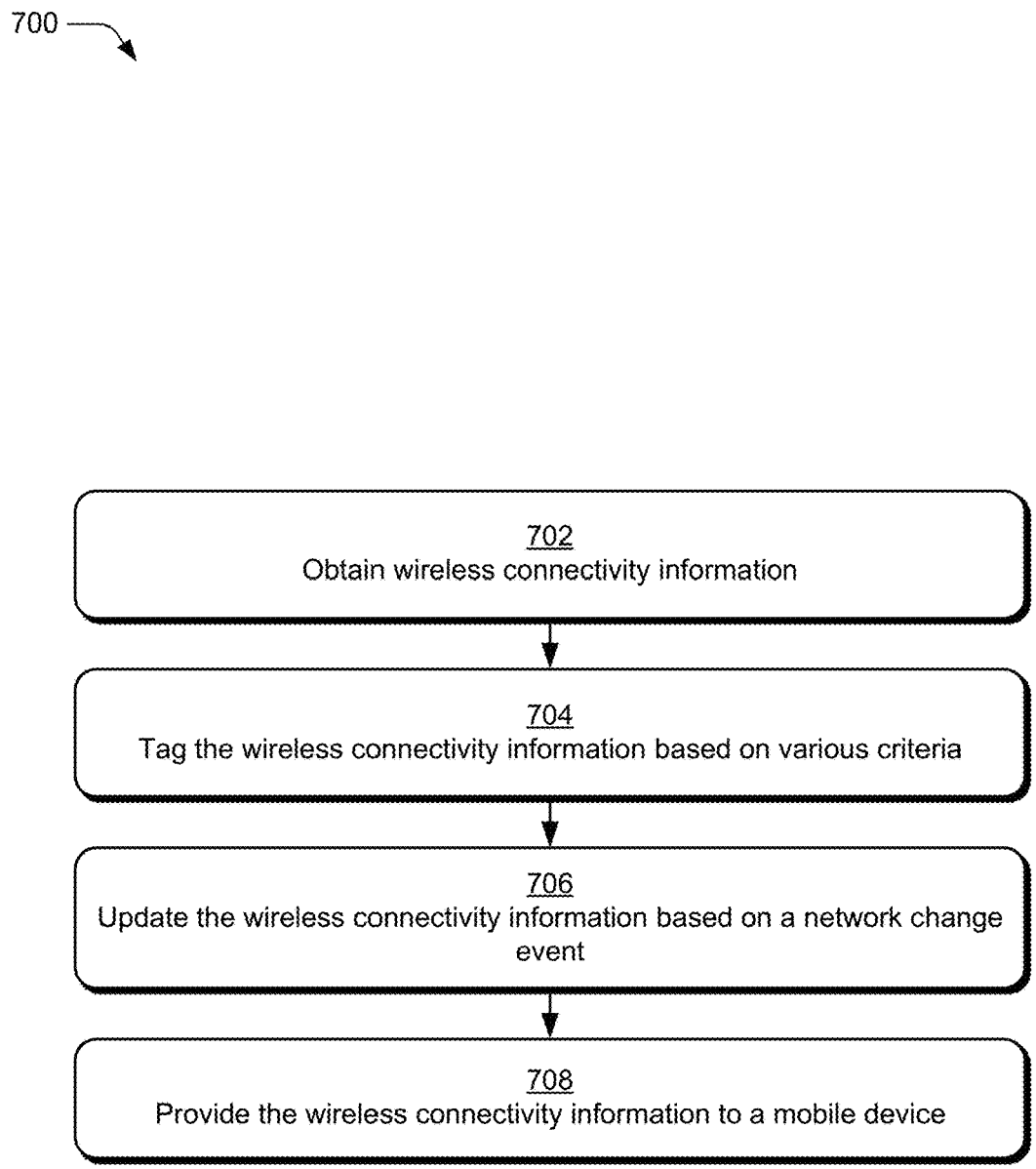
FIG. 7 illustrates an example method of wireless connectivity information for a mobile device in accordance with one or more implementations described herein.

FIG. 7 illustrates example method(s) 700 of wireless connectivity information for a mobile device as described herein, and the method is generally described with reference to a computing device (e.g., the host device 104) managing wireless connectivity information. In at least one implementation, the method represents an extension and/or variation on the method 500, described above.

At 702, wireless connectivity information is obtained by a computing device. The host device 104, for instance, obtains wireless connectivity information for a network, such as the network 106. In at least one implementation, the host device 104 obtains the wireless connectivity information by scanning for the network 106, detecting the network 106, and wirelessly connecting to the network 106. Alternatively or additionally, the host device 104 obtains the wireless connectivity information from some other source, such as a network-based service that stores the information and can propagate the information to different entities, such as the host device 104. In at least one implementation, the host device 104 obtains wireless connectivity information for multiple different networks, and stores the information as part of the network data 116. Examples of different types and instances of wireless connectivity information are described above.

At 704, the wireless connectivity information is tagged at the computing device based on various criteria. The host device 104, for instance, labels individual networks identified in the network data 116 based on attributes of the networks. Examples of such attributes includes wireless protocols supported by the networks, geographical locations of the networks, historical signal quality for the networks, service providers that implement the networks, recency of the wireless connectivity information for a network (e.g., how recently was the information collected), and so forth.

At 706, the wireless connectivity information is updated at the computing device based on a network change event. Examples of different network change events include a wireless handover of the host device 104 from one network to a different network, a handover between wireless cells, a network reconfiguration (e.g., a change in wireless frequencies and/or scrambling codes using by a network), PLMN scanning, and so forth. The host device 104, for instance, updates and/or deletes an existing entry for a network listed in the network data 116 based on the change event, or adds a new entry for a network (e.g., a newly-detected network) in the network data 116.

At 708, the wireless connectivity information is provided from the computing device to a mobile device. The host device 104, for instance, provides the query response 210 to the guest device 102, such as in response to receiving the host query 206. In at least one implementation, the wireless connectivity information is provided by correlating connection criteria of the mobile device to attributes of a network. For instance, the host query 206 can include connectivity criteria for the guest device 102, such as permitted and/or preferred wireless protocol(s), permitted and/or preferred service provider, network quality threshold (e.g., in terms of signal strength, signal-to-noise ratio, packet loss, and so forth), geographical location, and so on. The connectivity broker module 114 can correlate the connectivity criteria to a network and/or set of networks that correspond to the criteria, and can provide wireless connectivity information for the network(s) to the guest device 102. In at least one implementation, the connectivity broker module 114 ranks a set of networks based on their relative correlation to the connectivity criteria (e.g., strongest correlation first), and provides a ranked list to the guest device 102 for use by the guest connectivity module 110 for attempting to wirelessly connect to a network. Generally, this increases the likelihood that the guest device 102 will successfully wirelessly connect to a network that is estimated to provide the guest device 102 with a high quality wireless connection.

Thus, implementations of wireless connectivity information for a mobile device provide ways for enabling mobile devices to obtain wireless connectivity to a network while conserving devices resources, such as battery power, processor bandwidth, wireless radio, and so forth.

Figure 8:
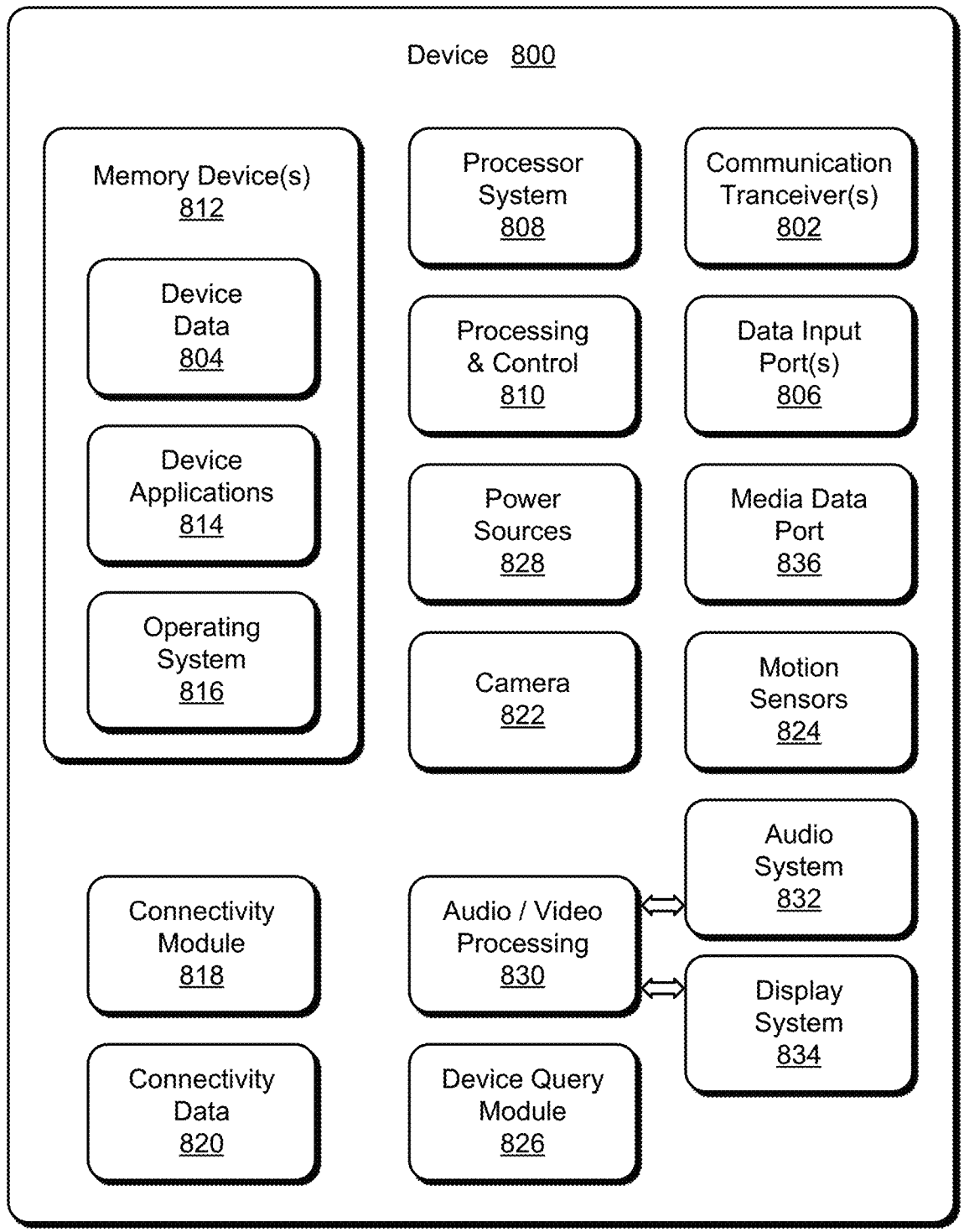
FIG. 8 illustrates various components of an example device that can implement aspects of wireless connectivity information for a mobile device.

FIG. 8 illustrates various components of an example device 800 in which aspects of wireless connectivity information for a mobile device can be implemented. The example device 800 can be implemented as any of the devices described with reference to the previous FIGS. 1-7, such as any type of mobile device, mobile phone, client device, wearable device, tablet, computing, communication, entertainment, gaming, media playback, and/or other type of electronic device. For example, the guest device 102 and the host device 104 as shown and described with reference to FIGS. 1-7 may be implemented as the example device 800. In a wearable device implementation, the device may include any one or combination of a watch, armband, wristband, bracelet, glove or pair of gloves, glasses, jewelry items, clothing items, any type of footwear or headwear, and/or other types of wearables.

The device 800 includes communication transceivers 802 that enable wired and/or wireless communication of device data 804 with other devices. The device data 804 can include any of device identifying data, device location data, wireless connectivity data, and wireless protocol data. Additionally, the device data 804 can include any type of audio, video, and/or image data. Example communication transceivers 802 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 800 may also include one or more data input ports 806 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 800 includes a processing system 808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 810. The device 800 may further include any type of a system bus or other data and command transfer system that couples the various components within the device. A system bus can include any one or combination of different bus structures and architectures, as well as control and data lines.

The device 800 also includes computer-readable storage memory 812 (e.g., memory devices) that enable data storage, such as data storage devices that can be accessed by a computing device, and that provide persistent storage of data and executable instructions (e.g., software applications, programs, functions, and the like). Examples of the computer-readable storage memory 812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 800 may also include a mass storage media device.

The computer-readable storage memory 812 provides data storage mechanisms to store the device data 804, other types of information and/or data, and various device applications 814 (e.g., software applications). For example, an operating system 816 can be maintained as software instructions with a memory device and executed by the processing system 808. The device applications may also include a device manager, such as any form of a control application, software application, signal-processing and control module, code that is native to a particular device, a hardware abstraction layer for a particular device, and so on.

In this example, the device 800 includes a connectivity module 818 that implements aspects of wireless connectivity information for a mobile device, and may be implemented with hardware components and/or in software as one of the device applications 814, such as when the device 800 is implemented as the guest device 102 or the host device 104. An example of the connectivity module 818 can be implemented as the guest connectivity module 110, and/or the connectivity broker module 114. In implementations, the connectivity module 818 may include independent processing, memory, and logic components as a computing and/or electronic device integrated with the device 800. The device 800 also includes connectivity data 820 for implementing aspects of wireless connectivity information for a mobile device, and may include data from the connectivity data 112 and/or the network data 116.

In this example, the example device 800 also includes a camera 822 and motion sensors 824, such as may be implemented in an inertial measurement unit (IMU). The motion sensors 824 can be implemented with various sensors, such as a gyroscope, an accelerometer, and/or other types of motion sensors to sense motion of the device. The various motion sensors 824 may also be implemented as components of an inertial measurement unit in the device.

The device 800 also includes a device query module 826, which is representative of functionality to perform direct device-to-device communication. For instance, for the guest device 102, the device query module 826 can be leveraged to communicate directly with the host device 104, such as to determine whether the host device 104 is available and if so, obtain the connectivity data 820. The device 800 can also include one or more power sources 828, such as when the device is implemented as a mobile device. The power sources 828 may include a charging and/or power system, and can be implemented as a flexible strip battery, a rechargeable battery, a charged super-capacitor, and/or any other type of active or passive power source. Generally, utilizing implementations of wireless connectivity information for a mobile device enables the power sources 828 to be conserved as part of a wireless network connectivity process.

The device 800 also includes an audio and/or video processing system 830 that generates audio data for an audio system 832 and/or generates display data for a display system 834. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 836. In implementations, the audio system and/or the display system are integrated components of the example device. Alternatively, the audio system and/or the display system are external, peripheral components to the example device.

Although implementations of wireless connectivity information for a mobile device have been described in language specific to features and/or methods, the subject of the appended claims is not necessarily limited to the specific features or methods described. Rather, the features and methods are disclosed as example implementations of wireless connectivity information for a mobile device, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, comprising: determining that a mobile device is to connect wirelessly to a network; querying, via a query addressed to a host device, the host device for wireless connectivity information usable to connect wirelessly to the network, said querying being independent of a scan for the network; receiving the wireless connectivity information from the host device, the wireless connectivity information including a set of one or more wireless frequencies that are usable to communicate with a network connectivity device; and utilizing the network connectivity information to establish a wireless connection with the network connectivity device for wireless connectivity to the network, the network connectivity device being different than the host device.

Alternatively or in addition to the above described method, any one or combination of: wherein said determining that a mobile device is to connect wirelessly to a network is based on one of a power-on event of the mobile device, a disconnection of the mobile device from a previous network, or availability of data to be communicated wirelessly; wherein said determining that a mobile device is to connect wirelessly to a network is based on an indication that the mobile device is attached to the host device; wherein said querying comprises a direct device-to-device communication between the mobile device and the host device; wherein said querying is responsive to determining that local wireless connectivity information is not available on the mobile device; wherein said querying is responsive to a failure to successfully wirelessly connect to the network using local wireless connectivity information from the mobile device; wherein said querying comprises a query that includes a connectivity criterion for wirelessly connecting the mobile device to a network; wherein the wireless connectivity information is received via a direct device-to-device communication from the host device to the mobile device.

A mobile device comprising: a wireless radio system to transmit and receive wireless signal; and a connectivity module implemented to: determine that the mobile device is to wirelessly connect to a network; query a host device for wireless connectivity information usable to wirelessly connect to the network, the query being separate from a scan for the network; receive the wireless connectivity information from the host device; and utilize the network connectivity information to establish a wireless connection with a network connectivity device for wireless connectivity to the network, the network connectivity device being different than the host device.

Alternatively or in addition to the above described mobile device, any one or combination of: wherein the connectivity module is implemented to determine that the mobile device is to wirelessly connect to a network responsive to the mobile device being attached to the host device; wherein the connectivity module is implemented to perform the query to the host device and receive the wireless connectivity information via direct device-to-device communications between the mobile device and the host device; wherein the connectivity module is further implemented to query the host device for wireless connectivity information responsive to determining that local wireless connectivity information is not available on the mobile device; wherein the wireless connectivity information includes a set of one or more wireless frequencies, and wherein the connectivity module is further implemented to utilize the one or more wireless frequencies to establish the wireless connection with the network connectivity device; wherein the wireless connectivity information includes wireless connectivity information for multiple networks ranked in order of preference, and wherein the connectivity module is further implemented to attempt to establish wireless connectivity with one or more of the networks in order of preference until the wireless connectivity to the network is established.

A system comprising: a computing device including a wireless radio system to transmit and receive wireless signal; and a broker module implemented by the computing device to: receive, from a mobile device a query for wireless connectivity information for wirelessly connecting to a network; generate a query response that includes the wireless connectivity information usable by the mobile device to wirelessly connect to a network connectivity device for wireless connectivity to the network, the query response including a set of one or more wireless frequencies that are usable to communicate with the network connectivity device, and the network connectivity device being separate and distinct from the computing device; and communicate, from the computing device and via a second wireless signal, the query response for receipt by the mobile device.

Alternatively or in addition to the above described system, any one or combination of: wherein the broker module is implemented by the computing device to obtain the wireless connectivity information by connecting wirelessly with the network; wherein the query for wireless connectivity information includes a connectivity criterion, and wherein the broker module is implemented by the computing device to select the network based on the connectivity criterion; wherein: the broker module is implemented by the computing device to maintain network data for multiple different networks, the network data being tagged based on attributes of the different networks; the query for wireless connectivity information includes a connectivity criterion; and the broker module is implemented by the computing device to select the network by correlating the connectivity criterion to an attribute of the network; wherein the first wireless signal and the second wireless signal comprises direct device-to-device communications between the computing device and the mobile device; wherein mobile device is physically connectable to the computing device, and wherein the query for wireless connectivity information is received in conjunction with a physical connection of the mobile device to the computing device.

The invention claimed is:

1. A system comprising:
a computing device including a wireless radio system to transmit and receive wireless signal; and
a broker module implementable by the computing device to:
receive, from a mobile device and via a first wireless signal, a query for wireless connectivity information for wirelessly connecting to a network;
generate a query response that includes the wireless connectivity information usable by the mobile device to wirelessly connect to a network connectivity device for wireless connectivity to the network, the query response including a set of one or more wireless frequencies that is usable to communicate with the network connectivity device, and the network connectivity device being separate and distinct from the computing device; and
communicate, from the computing device and via a second wireless signal, the query response for receipt by the mobile device.

2. The system as recited in claim 1, wherein the broker module is implemented by the computing device to obtain the wireless connectivity information by connecting wirelessly with the network.

3. The system as recited in claim 1, wherein the query for wireless connectivity information includes a connectivity criterion, and wherein the broker module is implemented by the computing device to select the network by correlating the connectivity criterion to one or more attributes of the network.

4. The system as recited in claim 1, wherein:
the broker module is implemented by the computing device to maintain network data for multiple different networks, the network data being tagged based on attributes of the different networks;
the query for wireless connectivity information includes a connectivity criterion; and
the broker module is implemented by the computing device to select the network by correlating the connectivity criterion to an attribute of the network.

5. The system as recited in claim 4, wherein the connectivity criterion comprises a network quality criterion.

6. The system as recited in claim 1, wherein the first wireless signal and the second wireless signal comprises direct device-to-device communications between the computing device and the mobile device.

7. The system as recited in claim 1, wherein mobile device is physically connectable to the computing device, and wherein the query for wireless connectivity information is received in conjunction with a physical connection of the mobile device to the computing device.

8. The system as recited in claim 1, wherein the broker module is further implementable by the computing device to:
receive updated wireless connectivity information for wirelessly connectivity to a different wireless network; and
communicate the updated wireless connectivity information to the mobile device.

9. A method, comprising:
receiving, at a computing device and from a mobile device and via a first wireless signal, a query for wireless connectivity information for wirelessly connecting to a network;
generating a query response that includes the wireless connectivity information usable by the mobile device to wirelessly connect to a network connectivity device for wireless connectivity to the network, the query response including a set of one or more wireless frequencies that is usable to communicate with the network connectivity device, and the network connectivity device being separate and distinct from the computing device; and
communicating, from the computing device and via a second wireless signal, the query response for receipt by the mobile device.

10. The method as recited in claim 9, wherein the query for wireless connectivity information includes a connectivity criterion, and wherein the method further comprises selecting the network connectivity device by correlating the connectivity criterion to an attribute of the network connectivity device.

11. The method as recited in claim 9, further comprising maintaining network data for multiple different networks, the network data being tagged based on attributes of the different networks;
the query for wireless connectivity information includes a connectivity criterion; and
the method further comprising selecting the network by correlating the connectivity criterion to an attribute of the network.

12. The method as recited in claim 11, wherein the connectivity criterion comprises a network quality criterion.

13. The method as recited in claim 9, wherein the first wireless signal and the second wireless signal comprises direct device-to-device communications between the computing device and the mobile device.

14. The method as recited in claim 9, wherein mobile device is physically connectable to the computing device, and wherein the query for wireless connectivity information is received in conjunction with a physical connection of the mobile device to the computing device.

15. The method as recited in claim 9, further comprising:
receiving, at the computing device, updated wireless connectivity information for wirelessly connectivity to a different wireless network; and
communicating the updated wireless connectivity information to the mobile device.

16. A system comprising:
a processing system; and
a memory storing instructions that are executable by the processing system to:
obtain, at a computing device, wireless connectivity information that is usable to connect to a wireless connectivity device for connectivity to a wireless network;
tag the wireless connectivity information with a set of attributes that pertain to the wireless network;
receive, at the computing device from a mobile device, a query for wireless connectivity information for wirelessly connecting to a network, the query including one or more wireless connectivity criteria for the mobile device;

correlate the wireless connectivity criteria to the set of attributes to determine that the wireless network corresponds to the wireless connectivity criteria; and communicate, from the computing device to the mobile device, a query response that includes at least some of the wireless connectivity information for connecting to the wireless network.

17. The system as recited in claim 16, wherein the at least some of the wireless connectivity information in the query response comprises a set of one or more wireless frequencies that is usable to communicate with the network connectivity device.

18. The system as recited in claim 16, wherein the set of attributes that pertain to the wireless network comprises an observed network quality attribute of the wireless network, the wireless connectivity criteria comprises a network quality criteria for the mobile device, and wherein to correlate the wireless connectivity criteria to the set of attributes comprises to correlate the network quality criteria to the network quality attribute.

19. The system as recited in claim 16, wherein the wireless connectivity information includes wireless connectivity information for multiple wireless networks, and wherein the instructions are executable by the processing system to rank the wireless networks based on their respective correlation to the wireless connectivity criteria for the mobile device, and wherein the query response includes a ranked list of the wireless networks.

20. The system as recited in claim 16, wherein the instructions are executable by the processing system to:
receive updated wireless connectivity information for wirelessly connectivity to a different wireless network; and
communicate the updated wireless connectivity information to the mobile device.

* * * * *